United States Patent [19]

Bridges

[11] Patent Number: 4,540,012

[45] Date of Patent: Sep. 10, 1985

[54] TEMPERATURE SENSITIVE VALVE BONNET ASSEMBLY

[75] Inventor: Charles D. Bridges, Houston, Tex.

[73] Assignee: Gray Tool Company, Houston, Tex.

[21] Appl. No.: 547,808

[22] Filed: Nov. 1, 1983

Related U.S. Application Data

[63] Continuation-in-part of Ser. No. 486,146, Apr. 18, 1983.

[51] Int. Cl.³ .................... F16K 17/38; F16K 41/14
[52] U.S. Cl. .................................... 137/72; 251/214; 251/330
[58] Field of Search .............. 137/72, 75; 251/214, 251/330, 327

[56] References Cited

U.S. PATENT DOCUMENTS

| 4,240,455 | 12/1980 | McGee | 137/72 X |
| 4,289,157 | 9/1981 | McGee | 137/72 |
| 4,307,745 | 12/1981 | McGee | 137/72 |

*Primary Examiner*—Arnold Rosenthal
*Attorney, Agent, or Firm*—Troxell K. Synder

[57] ABSTRACT

A valve having a normally non-rising stem (30a,b) journaled between bearings (38a,b 40a,b) is equipped with an energized drive spring (56a,b) for positively engaging backseat seal surfaces (64a,b, 66a,b) upon melting of a fusible ring (52a,b). The spring (56a,b) is compressed axially against the retainer (46a,b) by the cooperative action of the compression nut (58a,b) and the tubular spacer (49b, 50a,b), thereby normally avoiding undesirable axial thrust on the bearings (38a,b, 40a,b).

8 Claims, 4 Drawing Figures ial 4,540,012

TEMPERATURE SENSITIVE VALVE BONNET ASSEMBLY

CROSS REFERENCE

This application is a continuation-in-part of application Ser. No. 486,146, filed Apr. 18, 1983, now pending.

FIELD OF THE INVENTION

The present invention relates to an improvement in a normally non-rising stem valve for use in oil and gas producing industries having a metal-to-metal backseat stem seal and, more particularly, to a normally non-rising stem valve having a metal-to-metal backseat stem seal engageable when the valve is subjected to an abnormally high temperature, such as during a fire.

BACKGROUND OF THE INVENTION

The use of non-rising stem gate valves to control the flow of high pressure fluid or gas is well known in the energy producing industry. It is also known to use a metal-to-metal backseat seal between the valve stem and the valve bonnet to seal the inner valve chamber from the exterior environment in order to allow repacking of the valve stem or replacement of the valve stem journal bearings. See for example U.S. Pat. No. 4,149,558 "Selective Backseat Valve", by McGee et al.

In the oil and gas producing industries, this valve has been further modified so as to automatically backseat under high temperature conditions, such as a fire, during which the resilient packing seal between the valve stem and the valve bonnet may be damaged and allow leakage. This modification, disclosed in U.S. Pat. No. 4,289,157 "Valve With Heat-Responsive Bearing Assembly Providing Backseat Arrangement", by McGee, includes a fusible washer-like annulus placed in the valve stem journal bearing assembly. Upon heating of the valve to an abnormally high temperature, the fusible annulus melts and runs out of a vent provided to the exterior of the valve. The valve stem is now free to rise a limited extent due to the internal valve chamber pressure, thereby engaging the annular metal-to-metal sealing surfaces provided on the valve bonnet and the valve stem.

While this existing design has addressed a long-felt need in the industry, it does not meet new standards for fire resistant valves for use in petroleum or natural gas applications. In particular, these standards require that the metal-to-metal backseat be established and maintained even under conditions of zero gauge pressure within the valve chamber. It will be appreciated by those skilled in the art that the apparatus of U.S. Pat. No. 4,289,157 requires a finite pressure differential between the interior chamber and the valve exterior in order to drive the valve stem upwards and effect the backseat seal.

What is needed is a simple, effective means for engaging the metal-to-metal backseat seal in a non-rising stem valve under the combined conditions of abnormally high valve temperature and zero internal valve chamber gauge pressure.

SUMMARY OF THE INVENTION

The valve disclosed herein is of the non-rising stem gate type which, according to the present invention, has a metal-to-metal backseat stem seal actuable under abnormally high temperatures and low or no gauge pressure present within the valve chamber. This is accomplished by the use of a pair of facing annular metal sealing surfaces disposed respectively on the valve bonnet and the valve stem. An annular ring of fusible material normally holds these surfaces in an axially spaced apart relationship.

Should the valve be exposed to abnormally high temperatures, such as during a fire, the fusible ring melts, freeing the stem to rise a short distance and thus engaging the metal-to-metal backseat seal. This rise, according to the present invention, is accomplished by means of an energized annular spring disposed about the valve stem and acting upon the valve stem and bonnet to move the stem, forcing the melted fusible ring to flow from its normal location. The valve according to the present invention thus positively engages the metal-to-metal backseat seal upon the melting of the fusible material at a preselected temperature above the normal valve operating temperature.

It is also a feature of the valve according to the present invention that the melted fusible ring is positively driven from its normal position, regardless of the chamber pressure of the valve, by the action of the annular spring. A vent is provided to facilitate the flow of molten material out of the valve.

It is still another feature of the valve according to the present invention that the annular spring does not normally exert any axially thrust on the valve stem, being rather held in a compressed, stored energy, state until released by the melting of the fusible ring and only then acting upon the valve stem to engage the backseat seal.

Still another feature of the valve according to the present invention is that the backseat seal is engageable without regard to the position of the material flow regulating member, such as the gate, plug, or ball, and without altering this position at the time of engaging the backseat seal.

DESCRIPTION OF THE ALTERNATE AND PREFERRED EMBODIMENTS

Figure 1:
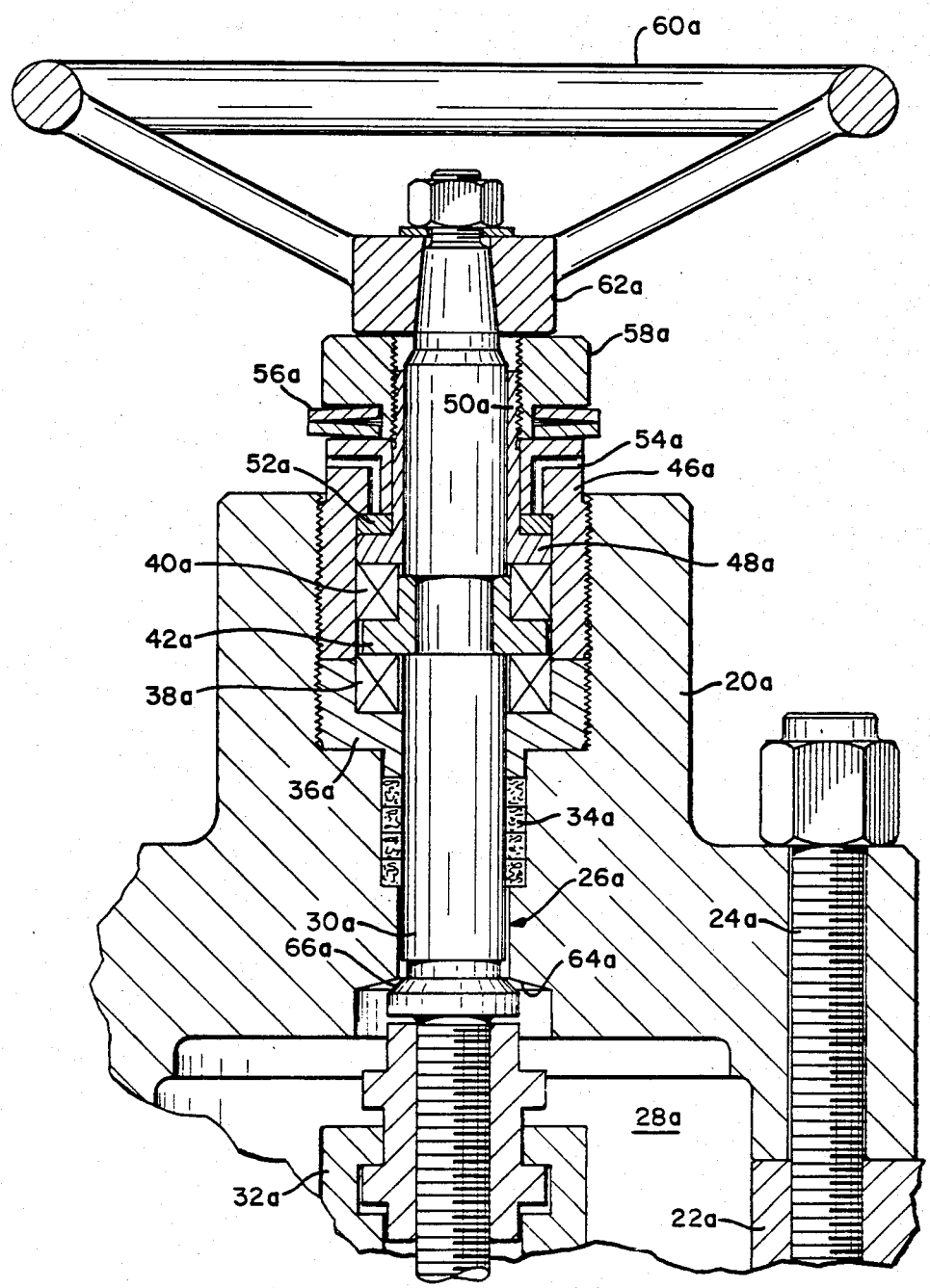
FIG. 1 shows a cross section of the alternate embodiment of the valve bonnet assembly in the normal operating condition.

Referring now to the drawing figures, and especially to FIG. 1, a cross sectional representation of the bonnet portion of the alternate embodiment of the valve according to the present invention may be seen. The remaining portion of the valve is similar to those valves present in the prior art and disclosed in U.S. Pat. No. 4,289,157 issued to McGee.

As shown in the drawing figure, valve bonnet 20a is shown secured to the valve body 22a by a series of hold-down bolts 24a arranged axially about the valve bonnet 20a. The valve bonnet 20a includes a central passage 26a which communicates with the chamber 28a in the valve body 22a. An elongated valve stem 30a is shown disposed within the central passage 26a for the purpose of moving the gate member 32a for regulating the flow of material through the valve. The gate member 32a and valve body 22a are virtually identical to similar structures well known in this art, and therefore not herein reproduced in full. It is to be understood that the gate member may equivalently be a ball, a plug, or any other flow regulating member actuable by rotation of the valve stem.

Leakage through the central passage 26a past the stem 30a is normally controlled by means of a resilient packing 34a disposed between the stem 30a and the walls of the central passage 26a as shown in the drawing figure. This packing is retained in place and sealingly engaged with the passage and the stem by the packing gland nut 36a which exerts an axial force upon the packing 34a. The packing material, although suitable for normal service use, is usually unable to resist the high temperature conditions which are present during a fire or other similar occurrence.

A split collar 42a is shown secured to the valve stem 30a between a bearing assembly comprising journal bearings 38a, 40a. The journal bearings 38a, 40a serve to permit rotation of the valve stem 30a. The journal bearings 38a, 40a and the valve stem 30a are normally restrained from outward axially movement in this embodiment by the action of the tubular spacer 50a which contacts the upper roller bearing 40a through a flanged end 48a. The flange section 48a in turn contacts a fusible ring 52a which is physically interposed between the flange 48a and the retainer 46a. The retainer 46a is shown as a gland threadedly engaging the valve bonnet 20a on the interior of the central passage 26a and the extending radially inward into the central passage 26a.

The fusible ring 52a is made of any of a number of materials known in the art such as lead, bismuth, or other materials with a relatively low temperature melting point. By proper selection of the material for fabrication of the fusible ring 52a, it is possible to provide a fusible ring which will retain its structural integrity under normal valve operating conditions, but will melt during periods of abnormally high temperature. Preferably the melting temperature of the fusible ring 52a is selected to be a temperature above normal valve operating conditions and below the temperature at which the packing material 34a will fail.

Upon melting of the fusible member 52a, the melted material flows out of the central passage 26a through the vent 54a shown in the retainer 46a. This vent 54a may alternatively be provided in the valve bonnet 20a or by other means, depending upon the particular arrangement of the valve members.

Continuing in the axially outward direction along the valve stem 30a, an annular drive spring 56a is shown compressed, or energized, between the retainer 46a and a compression ring or nut 58a. The compression ring or nut 58a is threadedly engaged with the tubular spacer 50a and allows compression of the spring 56a without normally exerting any force upon the upper or lower journal bearings 40a, 38a. The annular spring 56a is shown in FIG. 1 as a pair of thick spring washers having a generally frusto-conical cross section in the axial plane. The pair of spring washers are preferably arranged as shown in the drawings, with the larger radius surfaces touching. It is to be understood that a single spring washer, a coil spring, a hydraulic spring, or any other equivalent structure for exerting an axially outward force an the compression nut 58a may be substituted for the depicted spring 56a without departing from the scope of the invention. A handwheel 60a shown attached at the end of the stem 30a includes a drive ring or flange 62a extending outward from the valve stem 30a in close axial proximity to the compression nut 58a.

Upon exposure to abnormally high temperatures, such as during a fire, the fusible ring 52a will lose structural integrity and be forced to flow out of the central passage 26a through the vent 54a by the action of the annular spring 56a in providing axially outward thrust against the compression nut 58a and the tubular spacer 46a.

The axially outward motion of the compression nut 58a causes the drive flange 62a, and hence the valve stem 30a to also rise outward. This outward motion engages the backseat seal which comprises an inward facing annular sealing surface 64a, disposed in the bonnet 20a about the inner end of the central passage 26a where the central passage 26a intersects with the valve chamber 28a, and an outward facing annular sealing shoulder 66a disposed around the stem 30a. These two sealing surfaces 64a, 66a, which are normally held in a spaced apart relationship by the action of the fusible ring 52a in preventing axially outward motion of the valve stem 30a, are engaged and provide a complete metal-to-metal seal against leakage from the valve chamber 28a through the central passage 26a to the exterior of the valve.

Figure 2:
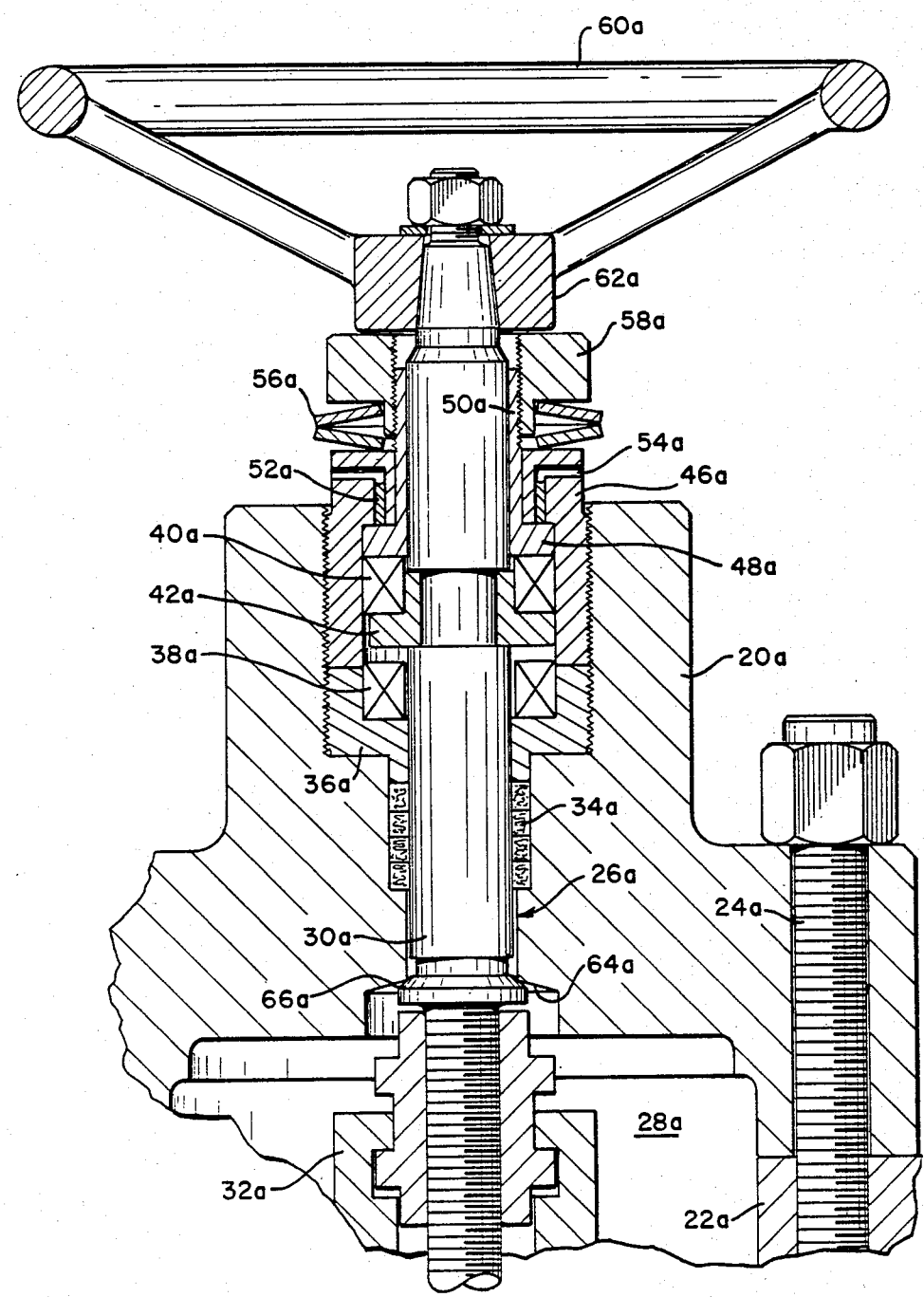
FIG. 2 shows the alternate embodiment of the valve bonnet assembly subsequent to exposure to high temperatures with the backseat seal engaged.

FIG. 2 shows the valve of FIG. 1 subsequent to the melting and venting of the fusible ring 52a and subsequent to the engagement of the sealing surfaces 64a, 66a. Surfaces 64a, 66a may optionally be coated with a soft metal, such as silver, to assist in the formation of an effective seal at a lower contact pressure.

The valve according to the present invention thus positively forms a backseat seal against leakage from the valve chamber 28a to the exterior via and the central passage 26a under conditions of abnormally high temperature. This feature is most useful not only in meeting requirements that such a backseat seal be formed under zero chamber gauge pressure, but also under those conditions in which an insufficient pressure is present within the valve chamber 28a for raising the stem 30a and engaging the seal.

Additionally, prior art valves under conditions of zero chamber gauge pressure may be heated to temperatures sufficient to ruin the packing 34a and melt the fusible ring 52a but not require the venting of the fusible ring 52a from the central passage 26a. Upon cooling of such a prior art valve, the fusible ring 52a will resolidify thus preventing engagement of the backseat seal and permitting leakage of material past the ruined packing 34a upon pressurization of the valve chamber. The slightest possibility of such an occurrence is avoided entirely by the valve according to the present invention which positively seals under similar circumstances.

Still another feature evident in the valve as shown in FIG. 1 is the ease with which the inner bonnet mechanism may be serviced. After removing the handwheel 60a from the valve stem 30a, it is possible to remove the retainer 46a, the tubular spacer 50a, the backseat drive spring 56a, and the compression nut 58a as a complete assembly simply by unscrewing the retainer 46a from the bonnet 20a.

Moreover, the valve as shown in FIGS. 1 and 2 accomplishes the objective of backseat sealing under low or no pressure conditions within the valve chamber 28a without normally exerting any axial force upon the valve stem 30a or bearings 38a, 40a. By avoiding this undesirable stem thrust under normal operating conditions, the valve is rendered more responsive and less prone to bearing failure.

Figure 3:
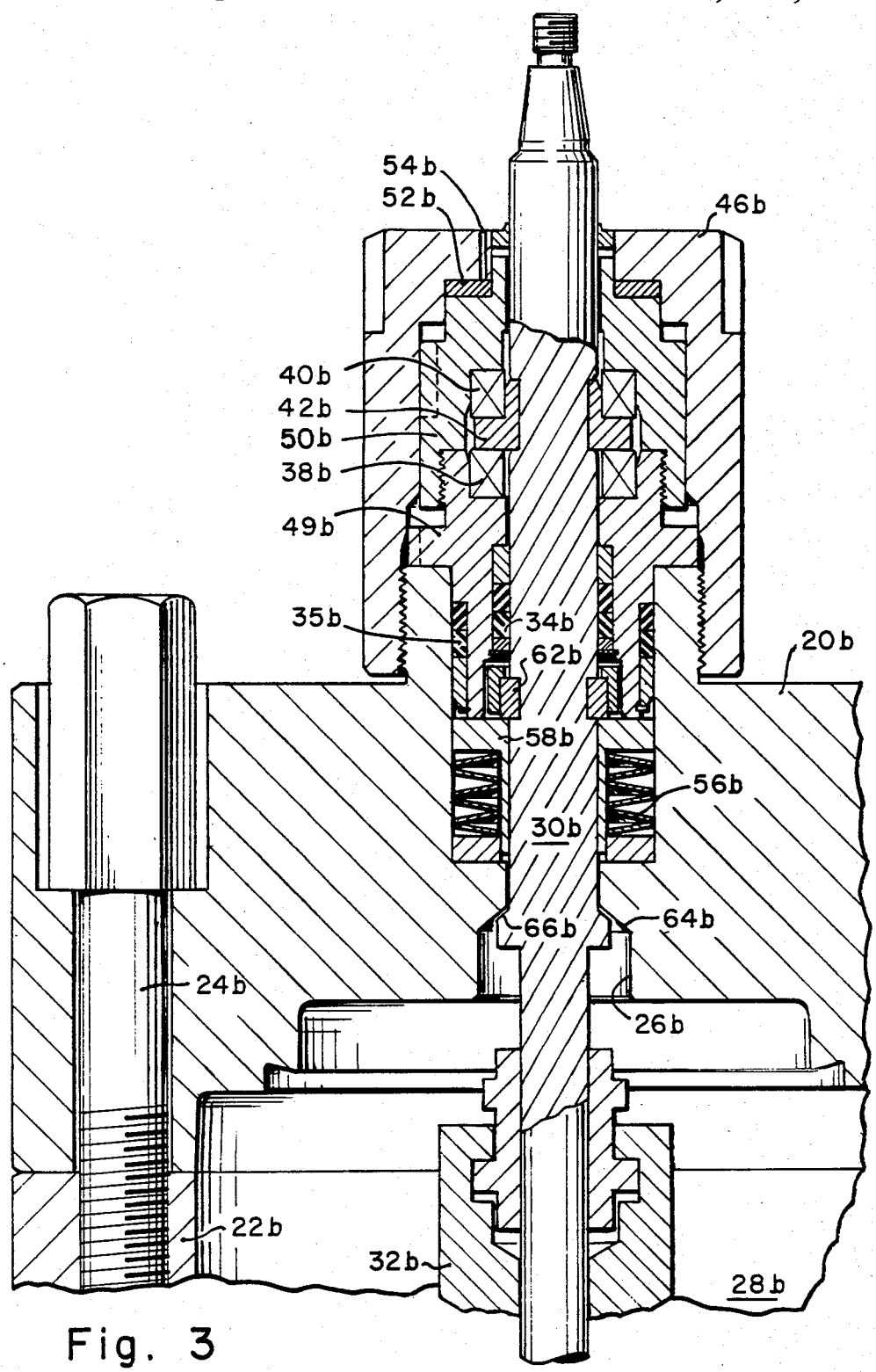
FIG. 3 shows a cross sectional view of the preferred embodiment of the valve bonnet assembly in the normal operating condition.

Turning now to FIG. 3, the preferred embodiment of the present invention will be described. The preferred embodiment shares the features of the alternative embodiment hereinabove described in that the preferred embodiment is also easy to service following a high temperature experience, and the energized drive spring also does not normally exert an outward axial force upon the valve stem 30b or the journal bearings 38b, 40b. It should be noted that similar structures of the alternate and preferred embodiments are numbered identically in the drawings with the addition of the respective suffixes "a" and "b".

The preferred embodiment as shown in cross section in FIG. 3 is again a bonnet 20b affixed to a valve body 22b which has a chamber 28b disposed therein. The valve stem 30b penetrates into the chamber 28b through a central passage 26b in the valve 20b. Rotation of the valve stem 30b actuates the gate member 32b for the regulation of the flow of material (not shown) through the valve body 22b.

The valve stem 30b is journaled between bearings 38b, 40b which are separated by a split collar 42b for the prevention of relative axial motion between the valve stem 30b and the journal bearings 38b, 40b. A retainer 46b is seen threadedly engaged with the valve bonnet 20b. The retainer 46b projects radially inward at the outer end to restrain a fusible ring 52b from outward axial motion.

The fusible ring 52b is, as in the alternative embodiment, composed of a low melting point material, such as lead, bismuth, etc. Axially inward of the fusible ring 52b can be seen the two-piece tubular spacer 49b, 50b. The tubular spacer 49b, 50b contacts the fusible ring 52b on the axially outward end, and cooperates on the axially inward end with the compression ring 58b. The compression ring 58b in turn contacts an energized annular drive spring 56b, shown in FIGS. 3 and 4 as a stack of spring washers, which is disposed between the valve bonnet 20b and the compression ring 58b for providing an axially outward thrust on the compression ring 58b and the tubular spacer 49b, 50b.

During normal operation, the annular drive spring 56b compresses the fusible ring 52b axially between the retainer 46b and the tubular spacer 49b, 50b. The inward facing annular sealing surface 64b disposed about inner end of the central passage 26b in the valve bonnet 20b and the outward facing annular sealing surface 66b of the valve stem 30b are kept axially spaced apart to permit free rotational movement of the valve stem 30b. Two-piece valve packing 34b, 35b maintains a seal against leakage from the central chamber 28b through the central passage 26b and outward from the valve. The journal bearings 38b, 40b are carried between the inner and outer pieces 49b, 50b of the tubular spacer and are not compressed or otherwise acted upon by the force transmitted by the annular drive springs 56b, but are likewise restrained from outward axial motion by the fusible ring 52b and the retainer 46b.

Figure 4:
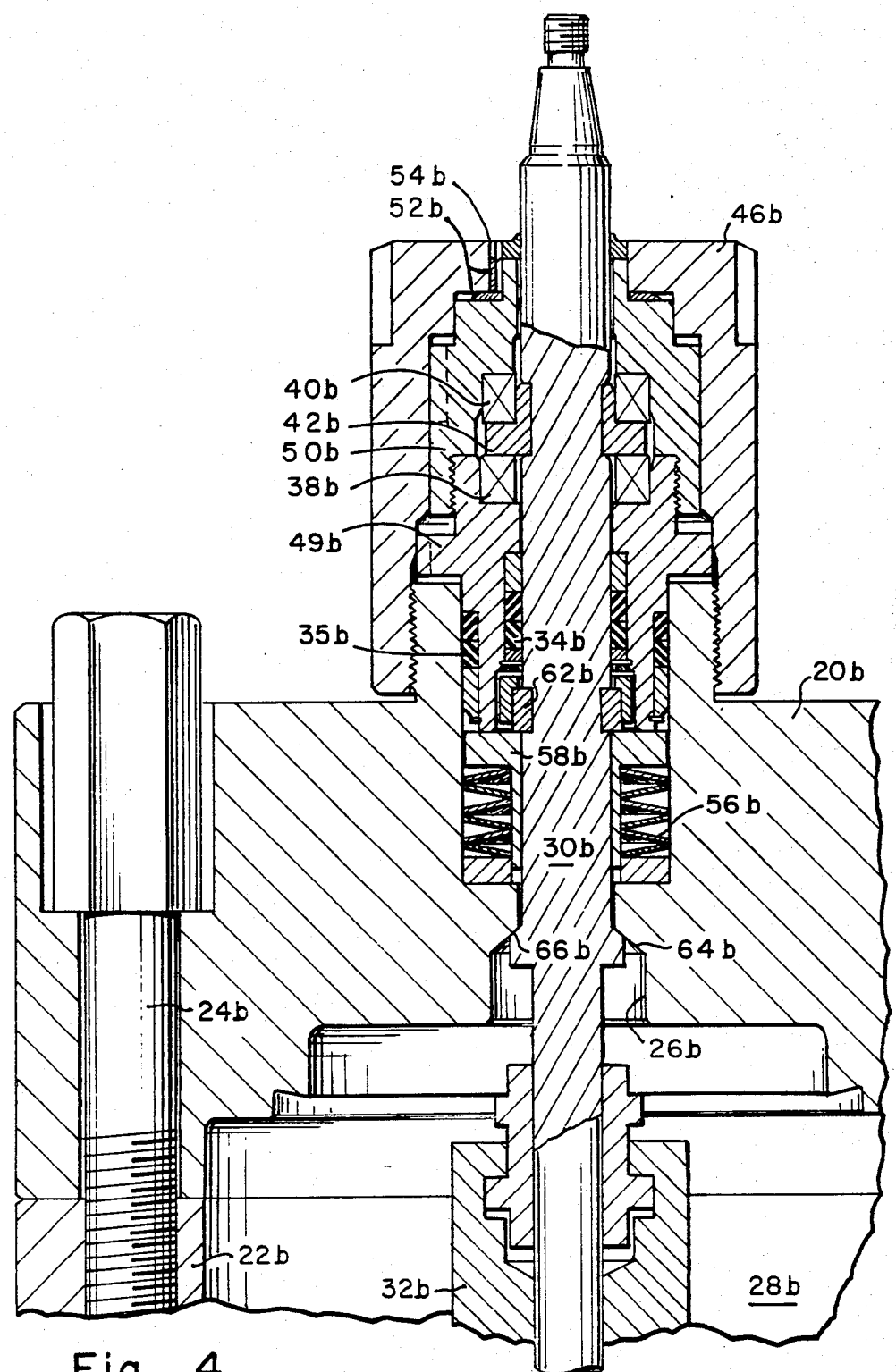
FIG. 4 shows the preferred embodiment of the valve bonnet assembly subsequent to exposure to high temperatures with the backseat seal engaged.

Should the preferred embodiment according to the present invention be subjected to a very high temperature condition, such as during a fire or other accident, the integrity of the resilient packing 34b, 35b may be compromised. As in the alternative embodiment discussed above, in this situation the fusible ring 52b melts and is forced out of the central passage 26b through the vent passage 54b in the retainer 46b. The action of the annular spring 56b on the compression ring 58b and the tubular spacer 49b, 50b positively squeezes the melted fusible ring 52b out of the event passage 54b as is shown in FIG. 4. As the tubular spacer 49b, 50b and the compression ring 58b move axially outward under the influence of the annular drive spring 56b, it can be seen that the tubular spacer 49b forces outward the journal bearing 38b, the split collar 42b, and hence the valve stem 30b, resulting in engagement of the annular sealing surfaces 64b, 66b. The engagement of these surfaces 64b, 66b results in the effecting of a positive backseat seal for the prevention of leakage of any high pressure material present within the valve chamber 28b through the central passage 26b, even if the resilient packing 34b, 35b should be completely destroyed by the high temperature condition.

One of the advantages of the invention as shown in the preferred embodiment is now apparent. Upon occurrence of a high temperature condition and later restoration of the valve to normal operating temperature, the valve bonnet of the preferred embodiment may be easily repaired by unscrewing the retainer 46b, and removing and replacing the damaged resilient packing 34b, 35b. The removal and replacement of the packing 34b, 35b is accomplished without the need to depressurize the valve chamber 28b as the backseat seal formed between surfaces 64b, 66b will remain positively engaged due to the continuing action of the annular drive spring 56b against the valve stem 30b through the compression ring 58b and the drive ring 62b shown secured to the stem 30b. With the new packing 34b, 35b installed about the valve stem 30b, a fresh fusible ring 52b may be inserted about the outer end of the tubular spacer 49b, 50b and the retainer 46b re-engaged with the valve bonnet 20b. As the retainer 46b is tightened, the tubular spacer 49b, 50b and the compression ring 58b will be driven axially inward, compressing the annular drive spring 56b and moving the valve stem 30b in the same direction. The backseat sealing surfaces 64b, 66b are thus restored to their normally axially spaced apart position and the valve according to the preferred embodiment of the present invention again ready for service.

The valve as depicted in FIGS. 3 and 4 is thus able to be serviced in a pressurized condition and, although similar in structure to the alternative embodiment disclosed in FIGS. 1 and 2 of this application and discussed hereinabove, is in possession of these and other features which have resulted in this embodiment being named herein as the preferred embodiment.

The advantages and features of the present invention which have been discussed, as well as many others, will be apparent to one skilled in the art upon a full examination of the foregoing specification and the appended claims and drawing figures.

I claim:

1. In a valve having a normally non-rising stem which passes out of a chamber in a valve housing through a bonnet having a central passage in which a packing normally seals between the valve stem and the valve bonnet, a bearing assembly journaling the valve stem relative to the bonnet, a retainer normally secured to said bonnet, a ring of fusible material disposed axially inward of the retainer and cooperating therewith for restraining the stem and bearing assembly against substantial outward movement, a vent through which the fusible material may pass after melting when subjected to an abnormally high temperature for allowing the valve stem and bearing assembly to move axially outward, an annular sealing surface circumferentially provided on the valve stem, and a second sealing surface provided on said bonnet within said chamber, the two sealing surfaces normally remaining spaced axially apart but which become annularly engaged in a sealed condition upon the axially outward movement of the valve stem, the improvement comprising:
- a tubular spacer, surrounding the valve stem and being restrained from outward axial movement by the fusible ring;
- an annular spring disposed about the valve stem for exerting an outward axial force on the tubular spacer;
- a compression ring, cooperating with the tubular spacer and the annular spring for transmitting the outward axial force therebetween, thereby compressing the fusible ring between the tubular spacer and the retainer.

2. A fire resistant, normally non-rising stem valve, comprising:
- a valve body having a chamber and a flow passage through the body and in communication with the chamber;
- a movable gate member within the chamber for regulating the flow of material through the flow passage;
- a bonnet, secured to the valve body, having a central passage therethrough, said central passage opening into the chamber at one end;
- an inward facing annular metal sealing surface disposed about the end of said central passage opening into the chamber;
- a valve stem, engaging the gate member at one end and extending through said central passage, for moving the gate member within the chamber, the valve stem further including an outward facing annular sealing shoulder normally held axially spaced apart from the inward facing sealing surface;
- valve packing, disposed in said central passage between the valve stem and the bonnet, for normally sealing against leakage from the chamber through said central passage;
- a bearing, located in said central passage around the valve stem for allowing rotation of the valve stem;
- a collar, extending radially outward of the valve stem at a point axially inward from the bearing for preventing outward axial movement of the valve stem past the bearing;
- a retainer, projecting radially inward into said central passage, said retainer being secured to the bonnet;
- a fusible annular ring, located axially inward of said retainer for maintaining the sealing surface and the sealing shoulder in the normally spaced apart relationship by preventing the axially outward rising of the valve stem and bearing, the annular ring being made of a fusible material melting at a selected temperature, said temperature being above the normal valve operating temperature;
- an annular drive spring, disposed about the valve stem for providing an outward axial force on the valve stem upon melting of the fusible ring;
- a tubular spacer, restrained from outward axial motion by contact with the fusible ring; and
- a compression ring, restrained against axially outward motion by the tubular spacer and urged axially outward by the annular spring, for axially compressing the annular spring in relation to the bonnet, said compression ring further being normally independent of the valve stem and bearing and exerting no axial force thereon.

3. The valve as recited in claim 2, wherein the retainer has a vent disposed therein for permitting the flow of fusible material out of said central passage upon melting of the fusible ring at said selected temperature.

4. The valve as recited in claim 2, further comprising a drive ring, secured to the valve stem outwardly axially adjacent the compression ring and engageable therewith only upon outward axial motion of the compression ring, for driving the valve stem axially outward subsequent to the melting of the fusible ring.

5. In a valve having a normally nonrising stem which passes out of a chamber in a valve housing through a bonnet having a central passage in which a packing normally seals between the valve stem and the valve bonnet, a bearing assembly journaling the valve stem relative to the bonnet, a retainer normally securing the bearing assembly relative to the bonnet against substantial outward axial motion of the valve stem by physically interposing a ring of fusible material between the retainer and the bearing assembly, a vent through which the fusible material may pass after melting when subjected to an abnormally high temperature for allowing the valve stem to move axially outward, an annular first metal sealing surface circumferentially provided on said valve stem and a second metal sealing surface provided on said bonnet within said chamber, the two sealing surfaces normally remaining spaced axially apart but which become annularly engaged in a sealed condition upon the axially outward movement of the valve stem, the improvement comprising:
- a tubular spacer, surrounding the valve stem, being disposed axially inward of the fusible ring and restrained from axially outward movement thereby, said spacer further extending axially inward from the fusible ring;
- an annular spring disposed about the valve stem axially inward of the tubular spacer; and
- a compression ring, disposed axially inward of the tubular spacer and normally restrained against outward axial motion by contact therewith, for axially compressing the annular spring against the bonnet independent of the valve stem and bearing assembly.

6. A fire resistant, normally non-rising stem valve, comprising:
- a valve body having a chamber and a flow passage through the body and in communication with the chamber;
- a movable gate member within the chamber for regulating the flow of material through the flow passage;
- a bonnet, secured to the valve body, having a central passage therethrough, said central passage opening into the chamber at one end;
- an inward facing annular metal sealing surface disposed about the end of said central passage opening into the chamber;
- a valve stem, engaging the gate member at one end and extending through said central passage, for moving the gate member within the chamber, the valve stem further including an outward facing annular sealing shoulder normally held axially spaced apart from the inward facing sealing surface;

valve packing, disposed in said central passage between the valve stem and the bonnet, for normally sealing against leakage from the chamber through said central passage;

a bearing, located in said central passage around the valve stem for allowing rotation of the valve stem;

a collar, extending radially outward of the valve stem at a point axially inward from the bearing for preventing outward axial movement of the valve stem passed the bearing;

a retainer, projecting radially inward into said central passage, said retainer being secured to the bonnet;

a fusible annular ring, located between said retainer and the bearing for maintaining the sealing surface and the sealing shoulder in the normally axially spaced apart relationship, the annular ring being made of a fusible material melting at a selected temperature, said temperature being above the normal valve operating temperature;

an annular drive spring, disposed about the valve stem for providing an outward axial force upon the valve stem, at least when the fusible ring is melted;

a tubular spacer, disposed within said central passage about the valve stem and contacting the fusible ring on one end, said spacer extending axially inward from the fusible ring and being restrained from axially outward motion thereby, and a compression ring, contacting the tubular spacer and being restrained from outward axial movement thereby, for axially compressing the annular spring independent of the valve stem and bearing.

7. The valve as recited in claim 6, wherein the retainer has a vent disposed therein for permitting the flow of fusible material out of said central passage upon melting of the fusible ring at said selected temperature.

8. The valve as recited in claim 6, further comprising a drive ring, secured to the valve stem outwardly axially adjacent the compression ring and engageable therewith only upon outward axial motion of the compression ring, for driving the valve stem axially outward subsequent to the melting of the fusible ring.

* * * * *